3,372,004
PROCESS FOR MAKING POROUS SODIUM FLUORIDE PELLETS

Earl W. Richardson, Paducah, Ky., and Leonard E. McNeese, Oak Ridge, Tenn., assignors to the United States of America as represented by the United States Atomic Energy Commission
No Drawing. Filed Mar. 23, 1966, Ser. No. 538,169
7 Claims. (Cl. 23—313)

The invention described herein was made in the course of, or under, a contract with the U.S. Atomic Energy Commission. This invention relates generally to porous sodium fluoride pellets, and more particularly to a method of making such pellets for use as a sorption agent for gaseous fluorides.

Sodium fluoride (NaF) is well known as a selective trapping agent for gaseous fluorides, particularly when the sodium fluoride is in pellet form. For example, in a typical application of such NaF pellets, a gas containing uranium hexafluoride ($UF_6$) may be passed through a heated bed of the NaF pellets for a selected time to sorb or trap a quantity of $UF_6$. When this $UF_6$ sorption is completed, the NaF pellet bed may be cooled and thereafter heated again to a sufficient temperature, usually higher than the temperature used during $UF_6$ sorption, to desorb or drive off the $UF_6$. Upon completing the $UF_6$ desorbing portion of the above sorption-desorption cycle, additional sorption-desorption cycles using the same bed of NaF pellets preferably take place in order to obviate the changing of the bed prior to each sorption-desorption cycle. Thus, it is desirable to use NaF pellets which are capable of withstanding repeated sorption-desorption cycles without significant deterioration while possessing both a high sorption rate for $UF_6$ and a high $UF_6$ capacity. These same desirable qualities for NaF pellets also exist when using the pellets in sorption of other gaseous fluorides, e.g., chromium fluoride, niobium fluoride, and zirconium fluoride.

The capacity of pelleted sodium fluoride for sorbing gaseous fluorides such as uranium hexafluoride is dependent upon particular properties possessed by the pellets. In a typical application of NaF pellets, the gaseous fluoride, e.g., $UF_6$, is transported by diffusion within the voids of the pellet to the point at which reaction occurs. Reaction results in partial (and eventually complete) blockage of the voids at the point; this impedes transport of additional gaseous fluoride to points interior to the point being considered. The voids at the external surface of a very reactive pellet soon become filled with the product of the reaction so that little deposition of reactive gas is observed within the pellet. In contrast to this, the voids at the external surface of a less reactive pellet become filled more slowly so that greater deposition of reactive gas is observed within the pellet and a greater amount of sorption will have occurred when the voids at the external surface become filled. In general, as the surface area per unit volume of pellet is increased, points within the pellet become more reactive so that the sorption capacity of the pellet decreases. The relation of initial pellet void fraction to sorption capacity is more straightforward since the product of the reaction is deposited within the voids.

Commercially available NaF pellets previously used to sorb and desorb gaseous fluorides have been found to function satisfactorily. However, these previous pellets are prepared by using a starting material other than sodium fluoride and a pellet producing process which together result in relatively expensive NaF pellets. On the other hand, the NaF pellets prepared by practicing the method of the present invention provide for fluoride sorption in a manner comparable to, if not better than, the previous NaF pellets and are produced from sodium fluoride powder at a cost considerably less than that of the previous NaF pellets.

An object of the present invention is to provide improved, porous NaF pellets which are particularly suitable for sorbing and desorbing gaseous fluorides and which have the capability of withstanding repeated sorption-desorption cycles.

Another object of the present invention is to provide improved NaF pellets which may be produced at a cost substantially less than that enjoyed by previously known NaF pellets.

Another object of the present invention is to provide porous NaF pellets which are more stable than and have the capability of sorbing greater quantities of fluorides than the previously available NaF pellets.

A further object of the present invention is to provide porous NaF pellets which have optimum surface area and void fraction properties for maximum absorption of various volatile metallic fluorides other than $UF_6$.

A further object of the present invention is to provide a new and improved process for producing NaF pellets.

A still further object of the present invention is to provide a method of making porous NaF pellets from sodium fluoride powder.

Other and further objects of the invention will be obvious upon an understanding of the illustrative embodiment about to be described, or will be indicated in the appended claims, and various advantages not referred to herein will occur to one skilled in the art upon employment of the invention in practice.

As briefly mentioned above, pellets of NaF capable of sorbing gaseous fluorides are known, but are commercially obtainable only at considerable expense. Thus, in order to find a process for making acceptable NaF pellets which could be provided at a more reasonable cost, applicants ventured into expensive investigations which resulted in the finding that comparatively inexpensive NaF pellets could be produced from NaF powder. Generally, this method for making NaF pellets from NaF powder comprises mixing NaF powder with water to form agglomerates. These agglomerates, while wet, are heated to a selected temperature between about 1200° and about 1700° F. to effect both the drying of the agglomerates and a selected degree of sintering for forming the porous sodium fluoride products or pellets.

In order to make satisfactory porous NaF pellets from NaF powder, it is preferable to heat the wet agglomerates for effecting the drying and sintering of the latter in a single operation or step so as to obviate moving or otherwise disturbing the agglomerates after the water has been partially or fully removed from the NaF agglomerates. This combined agglomerate drying and sintering operation is believed to be largely responsible for the formation of desirable NaF pellets in that transport of NaF agglomerates which have been at least partially dried in accordance with suggestions afforded by previous teachings has been found to result in deleterious deterioration of the agglomerates. In other words, the movement or transportation of the NaF agglomerates causes at least some of the plurality of NaF powder particles forming each agglomerate to lose their adhesion with adjoining particles and thereby effect a "break-down" or deterioration in the agglomerate structure. For example, tests have shown that NaF agglomerates after being at least partially dried at temperatures between about room temperature and 250° F. or even higher tend to disintegrate if any attempt is made to move them prior to their being sintered.

In addition to the maintenance of the agglomerate structure for sintering purposes, the utilization of the sintering procedure is of major importance for forming porous NaF pellets from NaF powder. Initial attempts in forming NaF pellets by following practices suggested by previous teachings have been unsuccessful since the resulting pellets become powdery upon being subjected to repeated fluoride sorption-desorption cycles. However, it was found that upon subjecting the agglomerates of NaF powder to sintering temperatures for a selected time period, the strength of the resulting pellets increased substantially so as to enable the pellets to withstand repeated fluoride sorption-desorption cycles. Also, these pellets are sufficiently porous to readily absorb appreciable quantities of gaseous fluoride. Sintering temperatures found to be successful for forming NaF pellets are within a range of temperatures between about 1200° F. and 1700° F. and more preferably about 1400° F. Sodium fluoride agglomerates subjected to temperatures less than about 1200° F. and greater than about 1700° F. have not proved to be as satisfactory as pellets sintered at a temperature between about 1200° F. and about 1700° F.—namely, a temperature of about 1400° F. For example, three samples of agglomerates selected from a single batch were respectively sintered at temperatures of about 1100° F., about 1400° F., and about 1700° F. for approximately the same time period. After sintering, each of the sample pellets was subjected to three sorption-desorption cycles. Each of these cycles consisted of placing the sample pellet in equilibrium with $UF_6$ at a pressure of 200 millimeters of mercury and at a temperature of 300° F. and thereafter desorbing the $UF_6$ from the sample for one hour by maintaining the pressure at 60 millimeters of mercury absolute and a temperature of 660° F. Upon completing the sorption-desorption cycles the sample pellet sintered at about 1100° F. had become somewhat powdery while the other two sample pellets showed no visual change. However, it was determined that the sample pellet sintered at about 1400° F. had somewhat more $UF_6$ capacity than the sample pellet sintered at about 1700° F. since the use of the higher sintering temperature gives a harder and denser pellet.

It has been found that sintering NaF agglomerates for about one hour when using a sintering temperature selected from the temperature range of about 1200° F. to about 1700° F. provides NaF pellets of satisfactory quality. However, the total heating period for the wet agglomerates is somewhat longer than one hour since some time is required to dry and preheat the agglomerates prior to the attainment of sintering. This total agglomerate heating time is also variable in that the wet agglomerates may be placed either in a suitable heating chamber prior to heating the latter or after the heating chamber has been preheated to some temperature which may be as high as the desired sintering temperature. For example, when wet agglomerates are loaded into a "cold" heating chamber the total heating period may be for about 2.5 hours, which includes about 1.5 hours for adequately drying and preheating the agglomerates. Of course, the drying and preheat time will be somewhat shorter than about 1.5 hours if the wet agglomerates are loaded into a heating chamber that has been preheated to some temperature which may be as high as the desired sintering temperature.

While sodium fluoride pellets of satisfactory porosity and strength have been successfully produced by using NaF powder, successful results have not been achieved with NaF in other forms, e.g., crystalline form. The particular mesh size of the NaF powder used is not critical, but powder of comparatively small mesh sizes may provide NaF pellets with greater porosity and fluoride capacity than pellets formed from NaF powder of larger mesh sizes.

In mixing the NaF powder with water to form the agglomerates, the ratio of powder to water is not critical since the only consequence of any significance is that agglomerates formed with a greater quantity of water than others may be bigger. Also, agglomerates of the same batch may contain different quantities of water without suffering any deleterious effects. Satisfactory mixing of the NaF powder and water to form the agglomerates may be achieved by using a conventional rotating disc pelletizer.

In order to provide a more facile understanding of the method of the present invention, an example of a typical NaF pellet producing process is set forth below.

A quantity of NaF powder of about $-100 +325$ mesh size is combined with water and mixed in a suitable manner to form wet NaF agglomerates. These wet agglomerates may then be collected in a shallow pan and placed in a muffle furnace which has been preheated to a desired sintering temperature of about 1400° F. The placement of the agglomerates into the pan and the pan into the furnace should be accomplished as rapidly as possible to assure that little or no drying of the agglomerates occurs. To obtain a sintering time of about one hour, the total time for the agglomerates in the furnace may be about 2 hours with about the first hour being devoted to drying and preheating the agglomerates. After sintering is completed, the pellets may be removed from the furnace and screened to obtain the desired size distribution.

NaF pellets prepared as just described have somewhat irregular configurations and an average weight of about 0.065 gram (g.). Also, these pellets have a specific surface area of about 0.10 m.$^2$/g. and a void fraction of about 30 percent. By changing the temperature and/or sintering time, pellets may be prepared so as to have a surface area ranging from about 0.01 to 0.3 m.$^2$/g. and a void fraction from about 15 to 45 percent. Also, if NaF pellets of even lower surface area and void fraction are desired, they may be readily fabricated by practicing the process of the present invention.

As compared to the previously known NaF pellets, the NaF pellets formed by practicing the present invention have a lower initial $UF_6$ sorption rate and capacity but provide a final $UF_6$ capacity somewhat greater than the previously known pellets. Further, the pellets of the present invention are found to be somewhat more stable than the previously known pellets.

Sodium fluoride pellets previously available will sorb other volatile metallic fluorides such as mentioned above but to a somewhat lesser extent than the NaF pellets of the present invention. By varying the properties of the subject pellets, a maximum loading of a particular fluoride can be obtained on the pellets. The optimum adsorption ability of the NaF is related to its surface area and void fraction, and the molecular weight of the fluoride being sorbed.

While the above description of the NaF pellet forming process particularly points out the desirability of transporting only wet agglomerates, it is believed that transportation of "dry" agglomerates may be satisfactorily achieved if they are subjected to a drying temperature of about 700° F. or more. However, from the standpoints of simplicity and economy, drying at such high temperatures for permitting movement of dry agglomerates is somewhat less desirable than drying and sintering in the same chamber.

It will be seen that the present invention sets forth a method of making NaF pellets which are not only substantially less expensive than previously available NaF pellets, but also have the capability of sorbing greater quantities of fluorides and are more stable than the previously available NaF pellets.

As various changes may be made in the process for preparing NaF pellets from NaF powder without departing from the spirit and scope of the invention and without sacrificing any of its advantages, it is to be understood that all matter herein is to be interpreted as illustrative and not in a limiting sense.

We claim:

1. A method of making a stable, porous body of sodium fluoride suitable for withstanding repeated gaseous fluoride sorption-desorption cycles, comprising the steps of mixing sodium fluoride powder with water to form a wet agglomerate, drying the agglomerate, and sintering the agglomerate by heating the latter to a temperature selected from a range of temperatures between about 1200° F. and about 1700° F. for forming the porous body.

2. A method of making a porous body of sodium fluoride as claimed in claim 1, including the additional step of maintaining the wet agglomerate in an essentially stationary position while effecting the drying and sintering thereof.

3. A method of making a porous body of sodium fluoride as claimed in claim 1, wherein the drying of the wet agglomerate is achieved by subjecting it for at least a substantial portion of the time required for such drying to an elevated temperature between at least about 700° F. and about 1700° C.

4. A method of making a porous body of sodium fluoride as claimed in claim 3, wherein the wet agglomerate is subjected to a single heating for successively effecting the drying and sintering of the agglomerate.

5. A method of making a porous body of sodium fluoride as claimed in claim 4, wherein the agglomerate after drying is maintained at the selected sintering temperature for about one hour.

6. A method of making a porous body of sodium fluoride as claimed in claim 5, including the additional step of maintaining the wet agglomerate in an essentially stationary position while effecting the drying and sintering thereof.

7. A method of making a porous body of sodium fluoride as claimed in claim 6, wherein the selected sintering temperature is about 1400° F.

References Cited

UNITED STATES PATENTS

| | | | |
|---|---|---|---|
| 2,024,176 | 12/1935 | Lloyd | 23—313 |
| 2,184,078 | 12/1939 | Hyde | 264—117 |
| 2,426,557 | 8/1947 | Long | 23—88 |
| 3,276,860 | 10/1966 | Lintz | 23—313 |

NORMAN YUDKOFF, *Primary Examiner.*

G. P. HINES, *Assistant Examiner.*